United States Patent
Contreras et al.

(10) Patent No.: US 9,535,980 B2
(45) Date of Patent: *Jan. 3, 2017

(54) NLP DURATION AND DURATION RANGE COMPARISON METHODOLOGY USING SIMILARITY WEIGHTING

(71) Applicant: International Business Machines Corporation, Armonk, NY (US)

(72) Inventors: David Contreras, Apex, NC (US); Robert C. Sizemore, Fuquay-Varina, NC (US); Sterling R. Smith, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/062,497

(22) Filed: Mar. 7, 2016

(65) Prior Publication Data

US 2016/0189033 A1   Jun. 30, 2016

Related U.S. Application Data

(63) Continuation of application No. 14/183,701, filed on Feb. 19, 2014, now Pat. No. 9,411,878.

(51) Int. Cl.
G06F 17/30 (2006.01)
G06N 5/02 (2006.01)
G06F 17/20 (2006.01)

(52) U.S. Cl.
CPC ... *G06F 17/30654* (2013.01); *G06F 17/30401* (2013.01); *G06F 17/30663* (2013.01); *G06N 5/02* (2013.01); *G06N 5/022* (2013.01)

(58) Field of Classification Search
None
See application file for complete search history.

(56) References Cited

U.S. PATENT DOCUMENTS

2009/0254971 A1   10/2009   Herz et al.
2009/0287678 A1   11/2009   Brown et al.
(Continued)

FOREIGN PATENT DOCUMENTS

WO   WO2009/140473 A1   11/2009
WO   WO2012/040356 A1   3/2012
WO   WO2012/047541 A1   4/2012

OTHER PUBLICATIONS

U.S. Appl. No. 14/183,701.
(Continued)

*Primary Examiner* — Stanley K Hill
*Assistant Examiner* — Mikayla Chubb
(74) *Attorney, Agent, or Firm* — Stephen R. Tkacs; Stephen J. Walder, Jr.; Diana R. Gerhardt

(57) ABSTRACT

A mechanism is provided in a question answering system for duration similarity weighting in a question answering system. The question answering system receives an input question. The question answering system generates a plurality of candidate answers to the input question using a corpus of information. The question answering system identifies a question-side duration value for the input question and identifies a policy-side duration value for a policy to be applied to an entity identified in the input question. The question answering system determines a duration similarity weight for each of the plurality of candidate answers. The question answering system applies the duration similarity weight to each of the plurality of candidate answers. The question answering system ranks the plurality of candidate answers and outputs one or more of the candidate answers.

8 Claims, 4 Drawing Sheets

(56) References Cited

U.S. PATENT DOCUMENTS

| | | |
|---|---|---|
| 2010/0235164 A1 | 9/2010 | Todhunter et al. |
| 2011/0066587 A1 | 3/2011 | Ferrucci et al. |
| 2011/0125734 A1 | 5/2011 | Duboue et al. |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2013/0097664 A1 | 4/2013 | Herz et al. |
| 2013/0252224 A1 | 9/2013 | Smith et al. |
| 2015/0220511 A1* | 8/2015 | Yang ............... G06F 17/30684 704/9 |
| 2015/0235130 A1 | 8/2015 | Contreras et al. |

OTHER PUBLICATIONS

U.S. Appl. No. 14/507,919.

U.S. Appl. No. 14/862,295.

Anonymously, "Technique for predictive analysis and subsequent ranking of candidates for online social Q&A interaction", An IP.com Prior Art Database Technical Disclosure, IPCOM000233143D, Nov. 25, 2013, 5 pages.

Brown, John S., "A Question-answering System Based on the Kay Parsing Algorithm", SPI DST, www.ip.com No. IPCOM000128329D, Original Publication Date: Dec. 31, 1973, IP.com Electronic Publication: Sep. 15, 2005, 13 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56, No. 3/4 Paper 3, May/Jul. 2012, pp. 3:1-3:15.

Minker, Jack, "The Q* Algorithm—A Search Strategy for a Deductive Question-Answering Systems", SPI DST, www.ip.com No. IPCOM000147982D, Original Publication Date: Feb. 28, 1973, IP.com Electronic Publication: Mar. 28, 2007, 27 pages.

Smola, Alexander et al., "Method and System for Searching a Collection of Objects Based on Similarity and Ranking", An IP.com Prior Art Database Technical Disclosure, IPCOM000198735D, Aug. 13, 2010, 7 pages.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

NLP DURATION AND DURATION RANGE COMPARISON METHODOLOGY USING SIMILARITY WEIGHTING

BACKGROUND

The present application relates generally to an improved data processing apparatus and method and more specifically to mechanisms for natural language duration and duration range comparison of candidate answers using similarity weighting.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for duration similarity weighting in a question answering system. The method comprises receiving an input question and generating a plurality of candidate answers to the input question using a corpus of information. The method further comprises identifying a question-side duration value for the input question and identifying a policy-side duration value for a policy to be applied to an entity identified in the input question. The method further comprises determining a duration similarity weight for each of the plurality of candidate answers and applying the duration similarity weight to each of the plurality of candidate answers. The method further comprises ranking the plurality of candidate answers and outputting one or more of the candidate answers.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for natural language duration and duration range comparison of candidate answers using similarity weighting. Timing decision logic in different industries has specific links to both time and duration. The concept of timing is very important when making decisions, such as healthcare providers assigning a patent new treatment, credit card companies contacting customers with timely promotional material, and brokers contacting investors with investment advice. Current logic has limitations on time considerations and almost no consideration of durations.

In accordance with the illustrative embodiments, a weighting mechanism compares specific durations and duration ranges between questions and potential answers. A Question Answering (QA) system includes scoring algorithms that have access to a quantified similarity weight value such that duration and duration ranges can be included in comparison accuracy calculations. The mechanism of the illustrative embodiments compares question and answer entities (i.e., terms, concepts, predicates) based on duration and duration ranges. The QA system scoring algorithms use the quantified similarity weight values for each entity in determining whether terms are within the same or similar time frames.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 1:
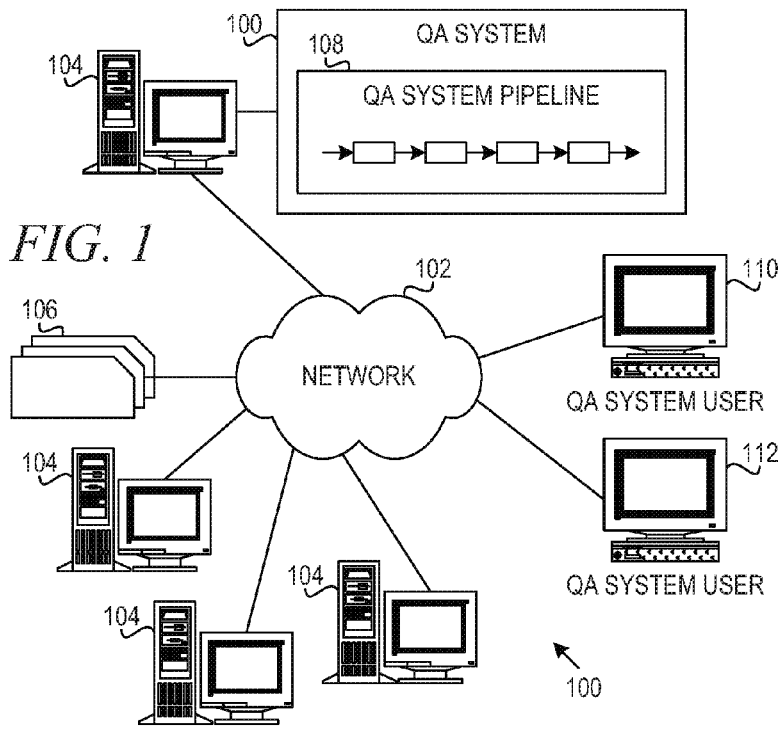
FIG. 1 depicts a schematic diagram of one illustrative embodiment of a question/answer creation (QA) system in a computer network.
Figure 2:
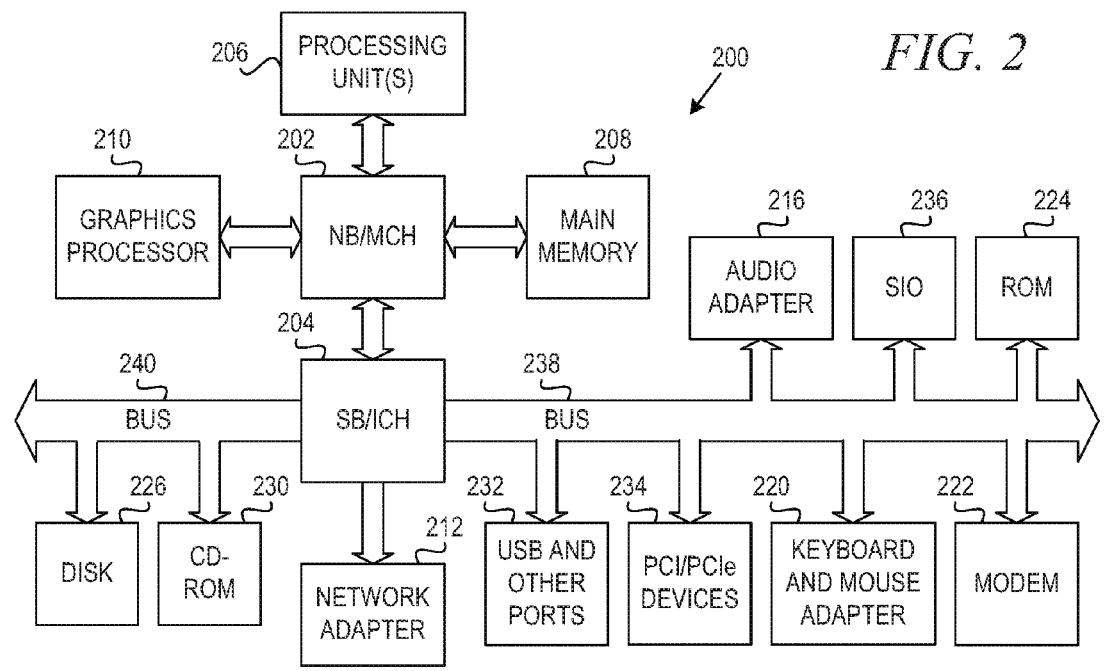
FIG. 2 is a block diagram of an example data processing system in which aspects of the illustrative embodiments may be implemented.
Figure 3:
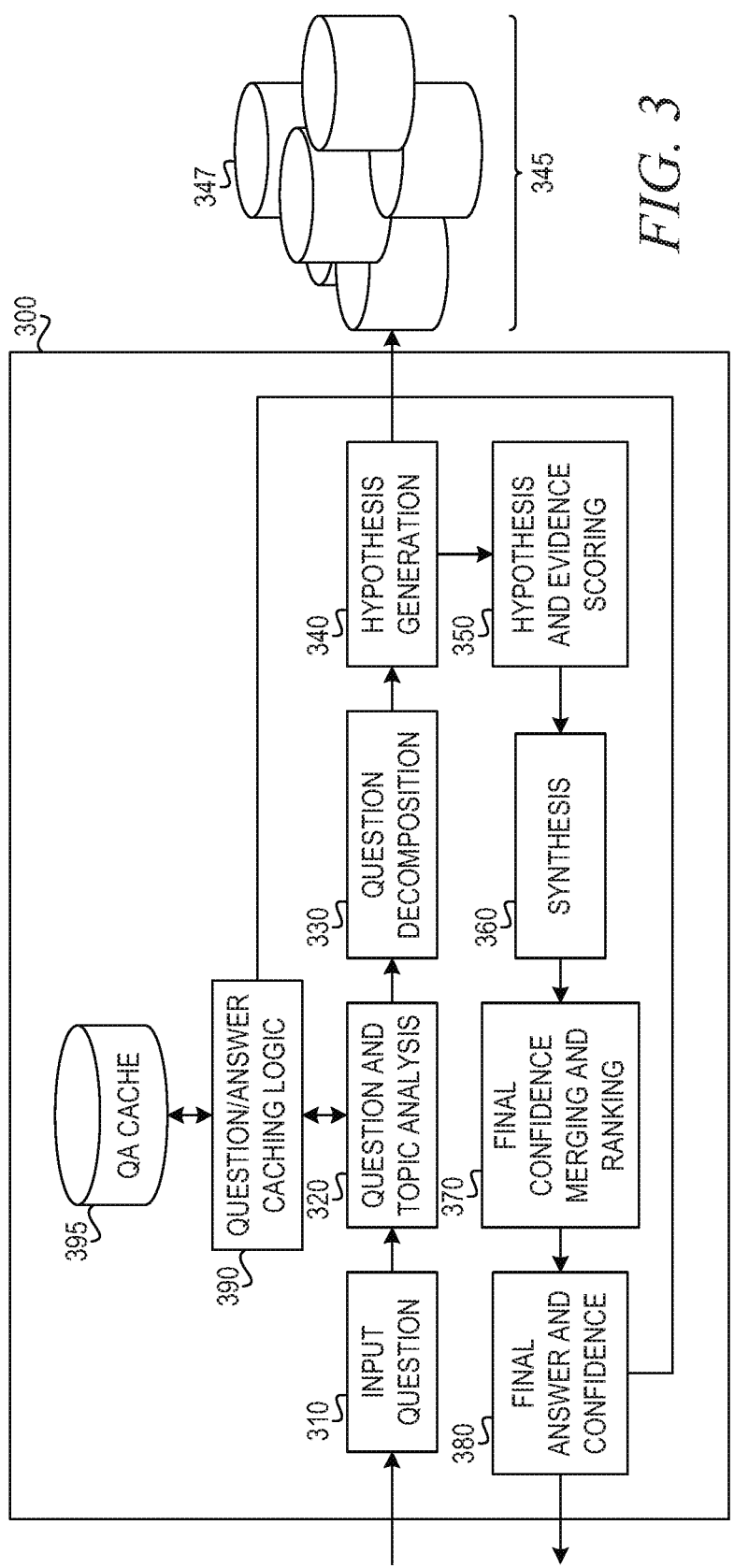
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question and answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model is then used to summarize a level of confidence that the Watson™ QA system has regarding the evidence that the potential response, i.e., candidate answer, is inferred by the question. This process is repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e., the question and topic analysis stage 320, parses the input question using natural language processing (NLP) techniques to extract major features from the input question, classify the major features according to types, e.g., names, dates, or any of a plethora of other defined topics. For example, in the example question above, the term "who" is associated with a topic for "persons" indicating that the identity of a person is being sought, "Washington" is identified as a proper name of a person with which the question is associated, "closest" is identified as a word indicative of proximity or relationship, and "advisors" is indicative of a noun or other language topic.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/ information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

Question and topic analysis 320 and question decomposition 330 parse question and potential answer text into various natural language processing (NLP) concepts. In accordance with an illustrative embodiment, hypothesis generation 340 generates question-side support evidence from the input question 310 itself or from corpora 345. For example, a question about a healthcare patient may identify the patient but not the patient history. In this case, hypothesis generation 340 may supplement the information in input question 310 with question-side support by examining patient history in corpora 345. Hypotheses generation 340 also identifies policy-side support or evidence within corpora 345.

Question-side support includes concepts or evidence concerning an entity in the question. For example, question-side support may include concepts or evidence about a patient, a potential customer, an investor, etc. Policy-side support includes concepts or evidence concerning a policy to be applied to the entity in the question. For example, policy-side support may include concepts or evidence about conditions that must be met to be covered for a medical procedure, an amount of time a customer has had an account open to be approved for a promotion, or the like. The question-side support and the policy-side support may include concepts or evidence that includes a duration or duration range relevant to answering the question.

Hypothesis and evidence scoring 350 considers concepts associated with duration and duration ranges for comparisons. Hypothesis and evidence scoring 350 uses a similarity weighting to produce values between zero and one. A similarity weighting of zero or a low value indicates non-similar duration or duration range for the concepts, whereas a value close to or equal to one indicates similar duration or duration ranges.

Scorers in hypothesis and evidence scoring 350 use concepts to calculate content matching accuracy based on a multitude of different scoring algorithms. The duration similarity weighting of the illustrative embodiment enables the scorers to include duration logic when calculating the accuracy of content matching between questions and potential answers. Also, the scorers may use a threshold value to determine whether to ignore duration logic. For example, if hypothesis and evidence scoring 350 identifies one or more candidate answers with a very high confidence (i.e., greater than the threshold), then hypothesis and evidence scoring 350 may turn off duration similarity weighting for those candidate answers.

In each of the examples below, the overall question being asked is whether or not a more advanced treatment for a patient's Thoracic outlet syndrome is covered by his insurance policy.

Example 1

In this example, the patient has stated that he has tried four months of treatment with support garments. Because the duration is prefixed with "at least," then the duration in the question text must be greater to have a score of one. In this case, the similarity score is less than one and will affect the term score.

Question side: There has been four months of adequate conservative treatment with one or more special support garments.

Policy side: Thoracic outlet syndrome (to include ulnar paresthesias) that has not responded to at least five months of adequate conservative treatment.

Example 2

In this example, the question again is the same, except the data provided represents a duration range.

Question side: There has been between two and four months of adequate conservative treatment with one or more special support garments.

Policy side: Thoracic outlet syndrome (to include ulnar paresthesias) that has not responded to at least five months of adequate conservative treatment.

Example 3

Again, the same question is being asked as above, but now the duration of six months would result in a similarity score of one and not affect the term score.

Question side: There has been six months of adequate conservative treatment with one or more special support garments.

Policy side: Thoracic outlet syndrome (to include ulnar paresthesias) that has not responded to at least five months of adequate conservative treatment.

Figure 4:
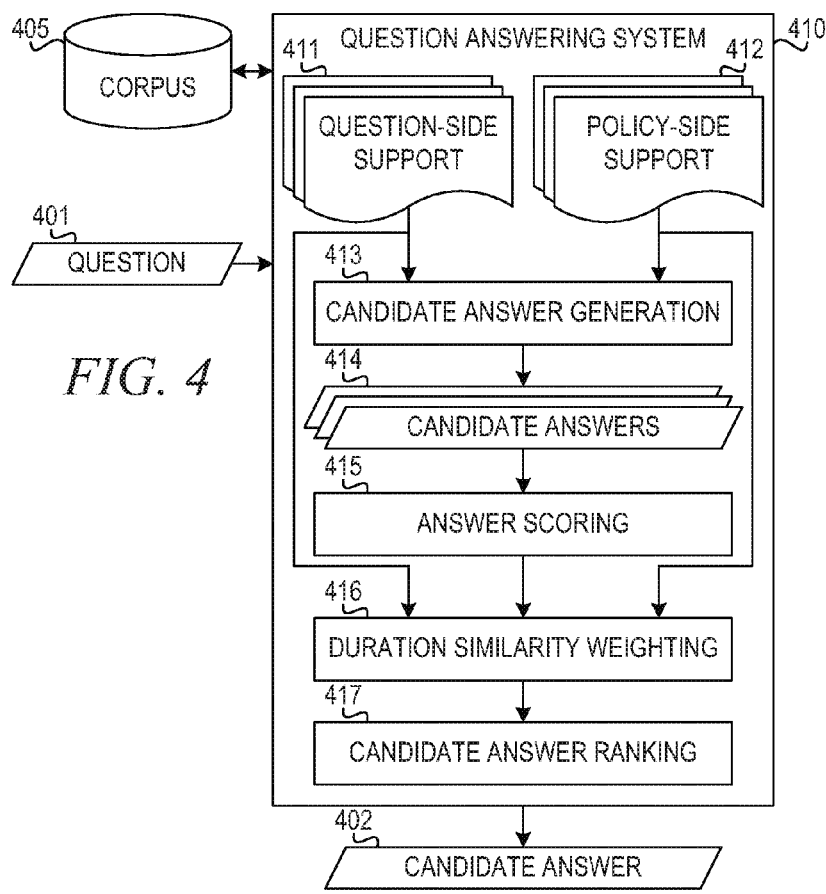
FIG. 4 is a block diagram illustrating a question answering system system with natural language duration and duration range comparison of candidate answers using similarity weighting in accordance with an illustrative embodiment.

FIG. 4 is a block diagram illustrating a question answering system system with natural language duration and duration range comparison of candidate answers using similarity weighting in accordance with an illustrative embodiment. Question answering (QA) system 410 receives corpus 405 and an input question 401. QA system 410 identifies question-side support 411 and policy-side support 412 from corpus 405. Candidate answer generation 413 generates candidate answers 414 from information in corpus 405 based on input question 401 and using question-side support or evidence 411 and policy-side support or evidence 412.

Answer scoring 415 uses concepts to calculate content matching accuracy based on a multitude of different scoring algorithms. Answer scoring 415 generates a confidence score for each candidate answer 414. Duration similarity weighting 416 compares specific durations and duration ranges between question-side evidence and policy-side evidence. Duration similarity weighting 416 generates a duration similarity weight value between zero and one based on a duration or duration range in question-side support or evidence and a duration or duration range in policy-side support or evidence.

In one embodiment, duration similarity weighting 416 generates the duration similarity weight value using the following equation:

$$\text{similarity} = \frac{\min(x, y)}{\max(x, y)}\left(e - \frac{(x-y)^2}{2\mu^2}\right),$$

where x is a duration or duration range from the question-side support or evidence, y is a duration or duration range from the policy-side support or evidence, and $$\mu = \frac{(x+y)}{2}.$$

In one example embodiment, $$e - \frac{(x-y)^2}{2\mu^2} = e - \frac{2(x-y)^2}{(x+y)},$$

since:

$$\lim_{x \to -\infty} e^x = 0,$$

and $$\lim_{x \to -\infty} e^x = 1.$$

Therefore, the value from the expression is one when x=y because x−y=0, and the value will always be between zero and one.

In addition, $$\frac{\min(x, y)}{\max(x, y)}$$

will always be between zero and one. This makes the equation the following:

$$\text{similarity} = \frac{\min(x, y)}{\max(x, y)}\left(e - \frac{(x-y)^2}{2\mu^2}\right).$$

Duration similarity weighting 416 applies the duration similarity weight value to the scores from answer scoring 415 for each of the candidate answers 414. That is, duration similarity weighting 416 multiplies the duration similarity weight for a given candidate answer by the confidence score for the candidate answer. Candidate answer ranking 417 ranks the candidate answers 414 by confidence score and outputs one or candidate answers 402 having a highest confidence score.

Figure 5:
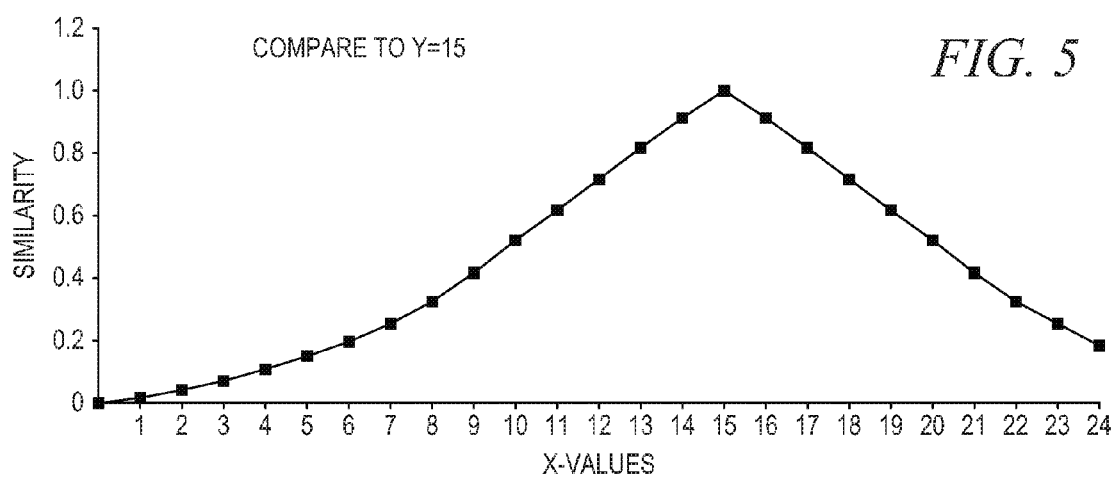
FIG. 5 illustrates similarity weight values for various duration values in accordance with an illustrative embodiment.

FIG. 5 illustrates similarity weight values for various duration values in accordance with an illustrative embodiment. In the depicted example, the policy-side evidence has a duration value of 15. The duration values vary from zero to one. For a question-side duration value of 15, the duration similarity weight value is one. The greater the difference between the question-side duration value and the policy-side duration value, the closer the duration weight value is to zero.

If the question-side support includes a duration and the policy-side support includes a duration range, or vice versa, then duration similarity weighting 416 generates the duration similarity weighting value based on the duration vs. the duration range. If the duration is a value within the duration range, then duration similarity weighting 416 determines the similarity weight value is one. If not, duration similarity weighting 416 compares the duration value with the duration range initial and end values and returns the value with the greatest similarity value.

If the question-side support and the policy-side support both include a duration range, then duration similarity weighting 416 generates the duration similarity weighting value based on duration range vs. duration range. If the duration ranges overlap, then duration similarity weighting 416 returns a similarity weight value of one. If not, duration similarity weighting 416 compares the begin point and end point of each duration range and returns the highest similarity value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
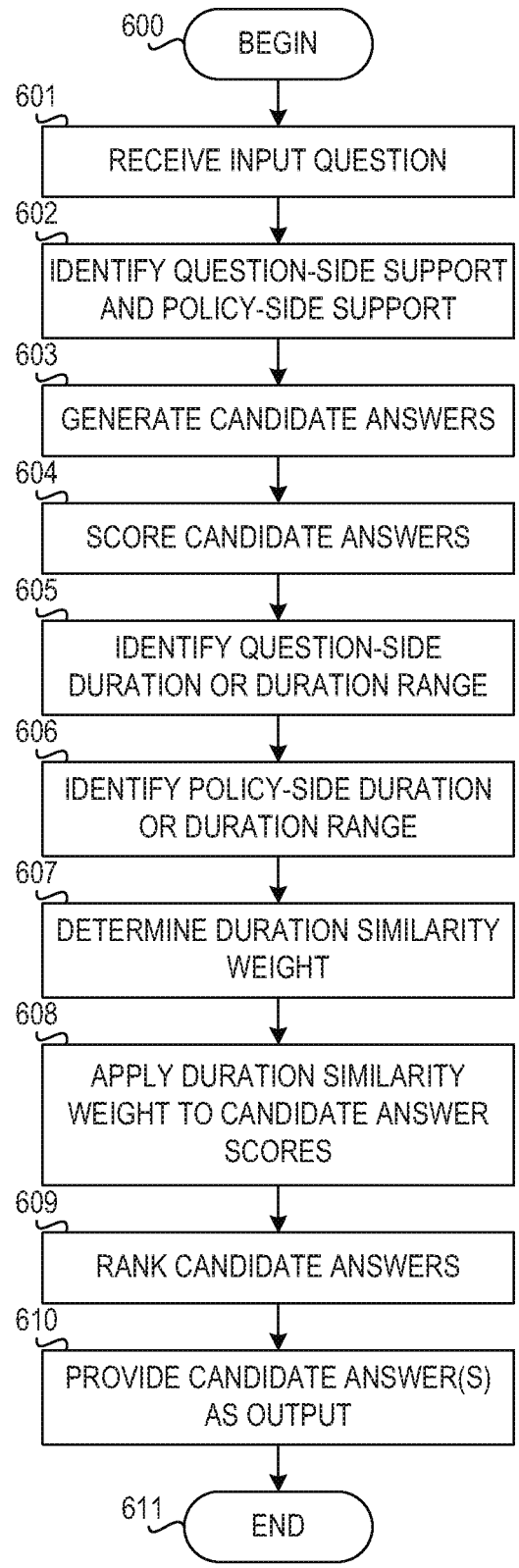
FIG. 6 is a flowchart illustrating operation of a question answering system for duration and duration range comparison of candidate answers using similarity weighting in accordance with an illustrative embodiment.

FIG. 6 is a flowchart illustrating operation of a question answering system for duration and duration range comparison of candidate answers using similarity weighting in accordance with an illustrative embodiment. Operation begins (block 600), and the system receives an input question (block 601). The system identifies question-side support evidence and policy-side support evidence for the input question based on a corpus of information (block 602). The system generates candidate answers for the input question based on the corpus of information, including the question-side support and the policy-side support (block 603), and determines a confidence score for the candidate answers (block 604).

The system then identifies a question-side duration or duration range (block 605) and identifies a policy-side duration or duration range (block 606). The system determines a duration similarity weight value for each candidate answer based on the question-side duration or duration range and the policy-side duration or duration range (block 607). The system then applies the duration similarity weights to the confidence scores of the candidate answers (bock 608). The system ranks the candidate answers according to confidence score (block 609). The system next provides one or more candidate answers as output (block 610). Thereafter, operation ends (block 611).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for duration similarity weighting in a question answering system, the method comprising:
receiving an input question concerning an entity;
generating a plurality of candidate answers to the input question using a corpus of information;
identifying a question-side duration value for the entity identified in the input question;
identifying a policy-side duration value for a policy applied to the entity to generate each of the plurality of candidate answers;
determining a duration similarity weight for each of the plurality of candidate answers based on a similarity between the question-side duration value and the policy-side duration value;
applying the duration similarity weight to each of the plurality of candidate answers;
ranking the plurality of candidate answers based on applying the duration similarity weight to each of the plurality of candidate answers; and
outputting one or more of the candidate answers based on the ranking.

2. The method of claim 1, wherein applying the duration similarity weight to each of the plurality of candidate answers comprises:
determining a confidence score for each given candidate answer; and
multiplying the duration similarity weight of the given candidate answer by the confidence score of the given candidate answer to form a duration similarity weighted confidence score.

3. The method of claim 2, wherein ranking the plurality of candidate answers comprises ranking the plurality of candidate answers according to duration similarity weighted confidence score.

4. The method of claim 1, wherein identifying the question-side duration value for the input question comprises identifying the question-side duration value within text of the input question.

5. The method of claim 1, wherein identifying the question-side duration value for the input question comprises:
identifying question-side support evidence from the corpus of information for the input question; and
identifying the question-side duration value within the question-side support evidence.

6. The method of claim 1, wherein identifying the policy-side duration value comprises:
identifying policy-side support evidence for the policy to be applied to the entity identified in the input question; and
identifying the policy-side duration value within the policy-side support evidence.

7. The method of claim 1, wherein determining the duration similarity weight for a given candidate answer comprises calculating the duration similarity weight, similarity, using the following equation:

$$\text{similarity} = \frac{\min(x, y)}{\max(x, y)}\left(e - \frac{(x-y)^2}{2\mu^2}\right),$$

where x is the question-side duration value, y is the policy-side duration value, and $$\mu = \frac{(x+y)}{2}.$$

8. The method of claim 1, wherein determining the duration similarity weight for a given candidate answer comprises calculating the duration similarity weight, similarity, using the following equation:

$$\text{similarity} = \frac{\min(x, y)}{\max(x, y)} \left( e - \frac{(x-y)^2}{2\mu^2} \right),$$

where x is the question-side duration value and y is the policy-side duration value.

* * * * *